(12) United States Patent
Sucharczuk et al.

(10) Patent No.: US 8,180,222 B2
(45) Date of Patent: *May 15, 2012

(54) POINT-TO-MULTIPOINT HIGH DATA RATE DELIVERY FROM OPTICAL NODE IN HFC SYSTEMS OVER EXISTING AND ADVANCED COAXIAL NETWORKS

(75) Inventors: Guy Sucharczuk, Sunnyvale, CA (US); Oleh J Sniezko, Highlands Ranch, CO (US); Krzysztof Pradzynski, Santa Clara, CA (US); Thomas K Fong, Redwood Shores, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/806,618

(22) Filed: Aug. 17, 2010

(65) Prior Publication Data

US 2010/0316384 A1 Dec. 16, 2010

Related U.S. Application Data

(62) Division of application No. 11/441,921, filed on May 26, 2006, now Pat. No. 7,778,546.

(60) Provisional application No. 60/772,723, filed on Feb. 13, 2006.

(51) Int. Cl.
*H04J 14/00* (2006.01)

(52) U.S. Cl. ............... 398/70; 398/71; 398/72
(58) Field of Classification Search ........... 398/71–21, 398/74–75, 77, 79, 66–72
See application file for complete search history.

(56) References Cited

U.S. PATENT DOCUMENTS

| 7,778,546 B2* | 8/2010 | Sucharczuk et al. ............ 398/72 |
| 2002/0136231 A1* | 9/2002 | Leatherbury et al. ......... 370/442 |
| 2003/0235235 A1* | 12/2003 | Santhoff ....................... 375/130 |
| 2006/0037040 A1* | 2/2006 | Mahalick et al. ............... 725/32 |
| 2006/0053462 A1* | 3/2006 | Albag et al. .................. 725/126 |
| 2006/0256799 A1 | 11/2006 | Eng |

FOREIGN PATENT DOCUMENTS

WO   WO 03/103287   12/2003

OTHER PUBLICATIONS

Annex to Form PCT/ISA/206 from PCT/US2007/003868.

* cited by examiner

*Primary Examiner* — Dzung Tran
(74) *Attorney, Agent, or Firm* — John Bruckner PC

(57) ABSTRACT

Transmitting and receiving data includes a process of transferring data over a coaxial network between an optical node and a plurality of cable modems of a hybrid fiber-coaxial cable network. A data transfer system which sends and receives data over a coaxial network located at an optical node of a hybrid fiber-coaxial cable network.

5 Claims, 7 Drawing Sheets

POINT-TO-MULTIPOINT HIGH DATA RATE DELIVERY FROM OPTICAL NODE IN HFC SYSTEMS OVER EXISTING AND ADVANCED COAXIAL NETWORKS

CROSS-REFERENCES TO RELATED APPLICATIONS

This application is a divisional of U.S. Ser. No. 11/441,921, filed May 26, 2006, now U.S. Pat. No. 7,778,546, issued Aug. 17, 2010 which in-turn claims a benefit of priority under 35 U.S.C. 119(e) from provisional patent application U.S. Ser. No. 60/772,723, filed Feb. 13, 2006, the entire contents of both of which are hereby expressly incorporated herein by reference for all purposes.

BACKGROUND INFORMATION

1. Field of the Invention

Embodiments of the invention relate generally to the field of data transfer systems. More particularly, an embodiment of the invention relates to data delivery systems in a hybrid fiber-coaxial network, and methods of delivering data in such systems.

2. Discussion of the Related Art

Prior art point-to-multipoint data delivery systems are known to those skilled in the art. For instance, a conventional point-to-multipoint system utilizes a hybrid fiber-coaxial cable (HFC) network of a cable television network. A HFC network uses optical fiber from a central distribution point (the head-end) to an optical node. Coaxial cable runs from the optical node to the service point pickups of individual subscribers, where it interfaces with the cable modems. FIG. 1 shows a conventional HFC network, originally developed for cable access television (CATV). At the central distribution point of the network (the headend) 100, video signals are received from satellites or other sources, combined with locally originated signals and sent down the optical fibers 101 to optical nodes 102. The signal is then converted to coaxial cables 103 which run to the subscriber premises. The fibers are generally in a star configuration while the coaxial cables follow a tree structure. Originally, HFC networks served as a one-way system to deliver video signals to the customers. The signal is delivered with each assigned a 6 MHz bandwidth in the US and 8 MHz in Europe. The frequency band of cable TV channels is 65-850 MHz. Later, the HFC networks were modified, through the addition of amplifiers 104 and other upgrades into a two-way system for providing internet access to the customers. A cable modem termination system (CMTS) at the headend served as the interface to the internet. The CMTS takes traffic from the group of customers served by it and forwards it to an internet service provider (ISP). The ISP, which may be the CMTS itself, will include servers and routers for assigning IP addresses, and providing the DOCSIS (Data Over Cable Service Interface Specification) protocols, which govern the standards for the 7 layers of the OSI (open systems interconnection). The top 3 layers of the OSI, the application, presentation, and session layers are application specific and are always implemented in user software. The transport layer accepts data from the session layer and segments data for transport. Routers operate on the third layer, the network layer. Generally, the CMTS deals with the bottom three layers, the network, datalink, and physical layers.

A single TV channel is generally allocated for downstream data flowing from the CMTS to each subscriber, where it is demodulated by a cable modem. A CMTS can serve up to 2000 cable modems through a single channel. The speeds are typically 3-50 Mbps depending on the bandwidth and modulation used, and the distance can be up to 100 km. More users can be accommodated by designating extra channels for admission. Upstream data flow, since there tends to be much less demand, is designated a 2 MHz channel, typically in the 5-42 MHz range. The data is multiplexed through time division multiple access (TDMA), with either QPSK or 16-QAM modulation. The CMTS allocated time slots to the different cable modems on the network. Thus all modems share the bandwidth and the downstream data are received by all the modems on the system, each modem filtering out the data it needs by deciphering the destination address in the header of each data packet send by the CMTS.

The existing methods provide much lower data rates or do not provide point-to-multipoint solutions or are over fiber or provide only physical layer or require active components between the optical node and the CPE.

A problem with this technology has been the upper limit on the data transfer rate, which is typically in the 3-50 Mbit/s range. Therefore, what is required is solution that allow for higher data rates while taking advantage of the existing architecture.

One unsatisfactory approach, in an attempt to solve the above-discussed problems involves the incorporation of fiber deeper into the network. Depending on how deep the fiber runs, these architectures are known as fiber-to-the-node (FTTN), fiber-to-the-curb (FTTC), or fiber-to-the-home (FTTH). However, a disadvantage of this approach is the limit of the bandwidth of the current deployments of FTTH, FTTC, and FTTN architectures supported by the current Ethernet passive optical networks (EPON), broadband passive optical networks (BPON), and gigabit passive optical networks (GPON) technologies. Furthermore, fibers using coarse wave division multiplexing (CWDM), if used for FDM analog and QAM signals, suffer from SRS-caused crosstalk between the CWDM wavelengths as well as experiencing high levels of dispersion in the 1550 nm window or anywhere above the OH peak.

Another disadvantage of this approach has been the relatively high cost of driving fiber deeper into the network. Therefore, what is also needed is a solution that meets the above-discussed requirements in a more cost-effective manner.

Another unsatisfactory approach has been the use of active components between the optical node and the customer premises equipment. The disadvantage with this approach is that it requires the integration of overlay nodes in the network architecture, and the active nodes have to be collaborated by other routers. Furthermore, this approach is likewise not cost-effective. Heretofore, the requirements of a faster data transfer rate and higher bandwidth have not been fully met. What is needed is a solution that solves these problems.

SUMMARY OF THE INVENTION

There is a need for the following embodiments of the invention. Of course, the invention is not limited to these embodiments.

According to an embodiment of the invention, a process comprises: transferring data over a coaxial network at a bandwidth above 1000 MHz, wherein the process of transferring data transfers the data between an optical node and a plurality of cable modems of a hybrid fiber-coaxial cable network. According to another embodiment of the invention, a machine comprises: a data transfer system which sends and receives data over a coaxial network at a bandwidth above 1000 MHz, wherein the data transfer system is located at an optical node of a hybrid fiber-coaxial cable network.

These, and other, embodiments of the invention will be better appreciated and understood when considered in conjunction with the following description and the accompanying drawings. It should be understood, however, that the following description, while indicating various embodiments of the invention and numerous specific details thereof, is given for the purpose of illustration and does not imply limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer concept of embodiments of the invention, and of components combinable with embodiments of the invention, and operation of systems provided with embodiments of the invention, will be readily apparent by referring to the exemplary, and therefore nonlimiting, embodiments illustrated in the drawings (wherein identical reference numerals designate the same elements). Embodiments of the invention may be better understood by reference to one or more of these drawings in combination with the following description presented herein. It should be noted that the features illustrated in the drawings are not necessarily drawn to scale.

DESCRIPTION OF PREFERRED EMBODIMENTS

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The invention covers architecture, methods and apparatuses placed in an optical node or in an optical node housing (hardened, weather resistant and water resistant) to deliver high data rate point-to-multipoint service to the customers served by the node. The data rate exceeds 100 Mbps. The service is delivered above the bandwidth traditionally occupied by services delivered over HFC network within 54-870 MHz or 54-1002 MHz. The system takes advantage of the high bandwidth capacity of coaxial cable and coaxial cable passives. In one embodiment of the invention, the apparatus is placed in the optical node and provides a complete system, including the physical layer, the datalink layer, and a multiple access protocol. The invention can be fully passive, partially passive and/or active between the optical node(s) and the customer premises equipment (CPE) or other service pickup points.

The coaxial spectrum is not limited to 870 MHz. Most of the current deployments of HFC networks use 1000 MHz passives and the passive section of coaxial plant can be easily used to 1,500 MHz and even to 3,000 MHz as some predict. This allows for a use of the bandwidth above 870 MHz for point-to-multipoint technology deployment over passive coaxial cables.

Figure 1:
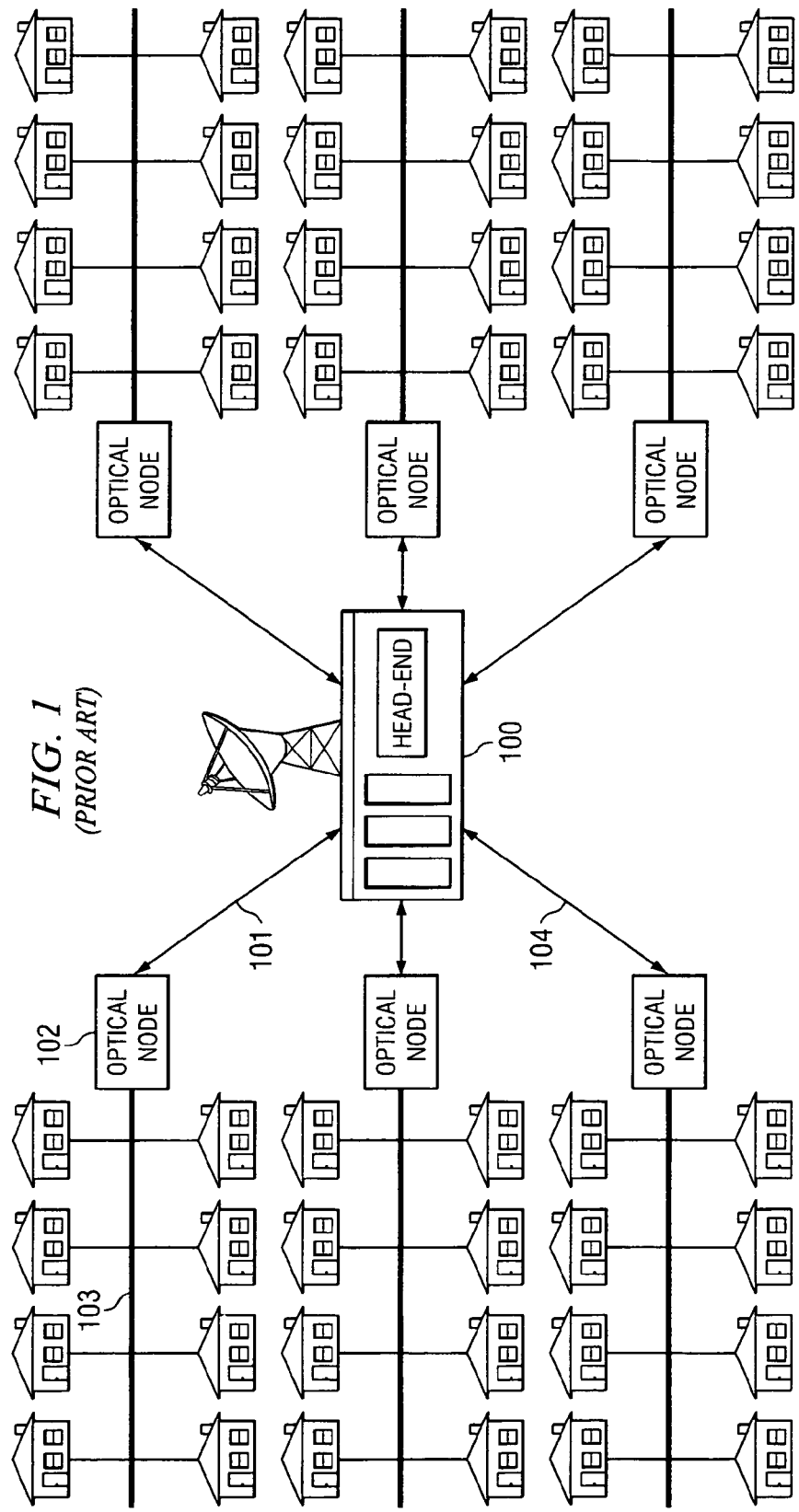
FIG. 1 is a view of a conventional HFC network, appropriately labeled "PRIOR ART."
Figure 2:
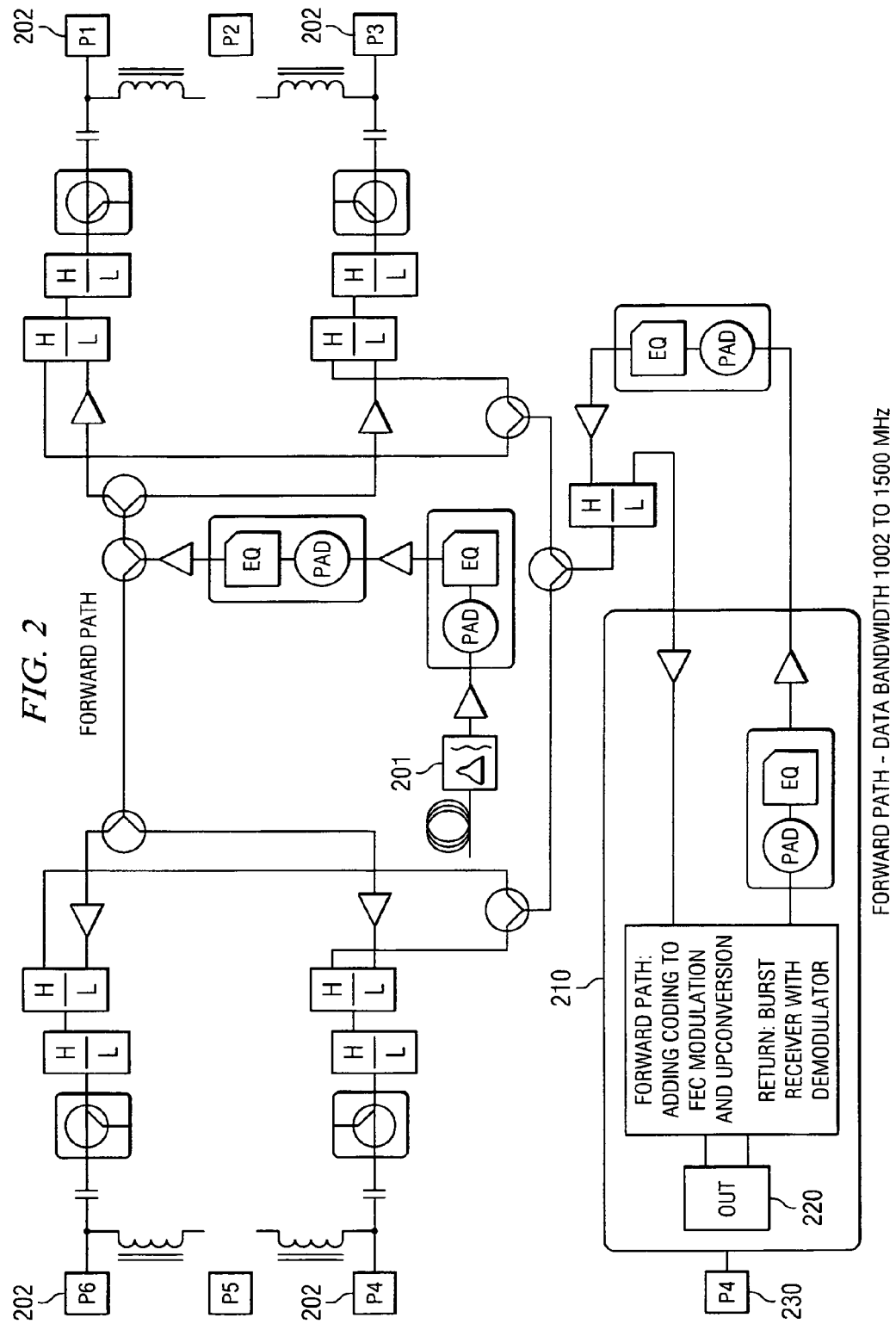
FIG. 2 shows a schematic view of a network, representing an embodiment of the invention.

Reference will now be made to FIG. 2, which shows one embodiment of the invention, a module and a method of injecting the signal into an existing two-way HFC network 201 to deliver the signal to the CPE 202. The module 210 can be placed in the existing optical node or in a separate housing. Similarly, the signal injection components may be internal to the node or externally collocated with the module or in separate housing altogether. The link between the node and CMTS or headend can be one of many baseband data links with or without aggregation (GigE or 10 GigE) with or without switches and/or a router at the interface point with the node, OC-3 through OC-192, fiber-channel through quad-fiber-channel are just a few of the examples. This connection will be on optical fiber through the optical line termination (OLT) 220. The optical signal from the fiber is converted to an electrical signal through photodetectors. The signal is modulated, coding is added for forward error correction (FEC), and the signal is upconverted to the requisite frequencies. One possible solution for the coding and modulation is orthogonal frequency division multiplexing (OFDM) with quadrature amplitude modulation (QAM), and media access control (MAC) based on OFDM. Other solutions can be used as well, such as synchronous-code division multiple access (S-CDMA), subband division multiplexing (SDM), or SDM based on wavelets. One of ordinary skill in the art would know how to implement the coding and modulation through either a hardware or a software solution, or a combination of the two. A PAD circuit is used to attenuate the signal, an equalizer (EQ) introduces compensation for frequency discriminative effects, and an amplifier amplifies the signal. A diplex high-pass/low-pass filter separates the upstream and downstream flows of data.

Figure 3:
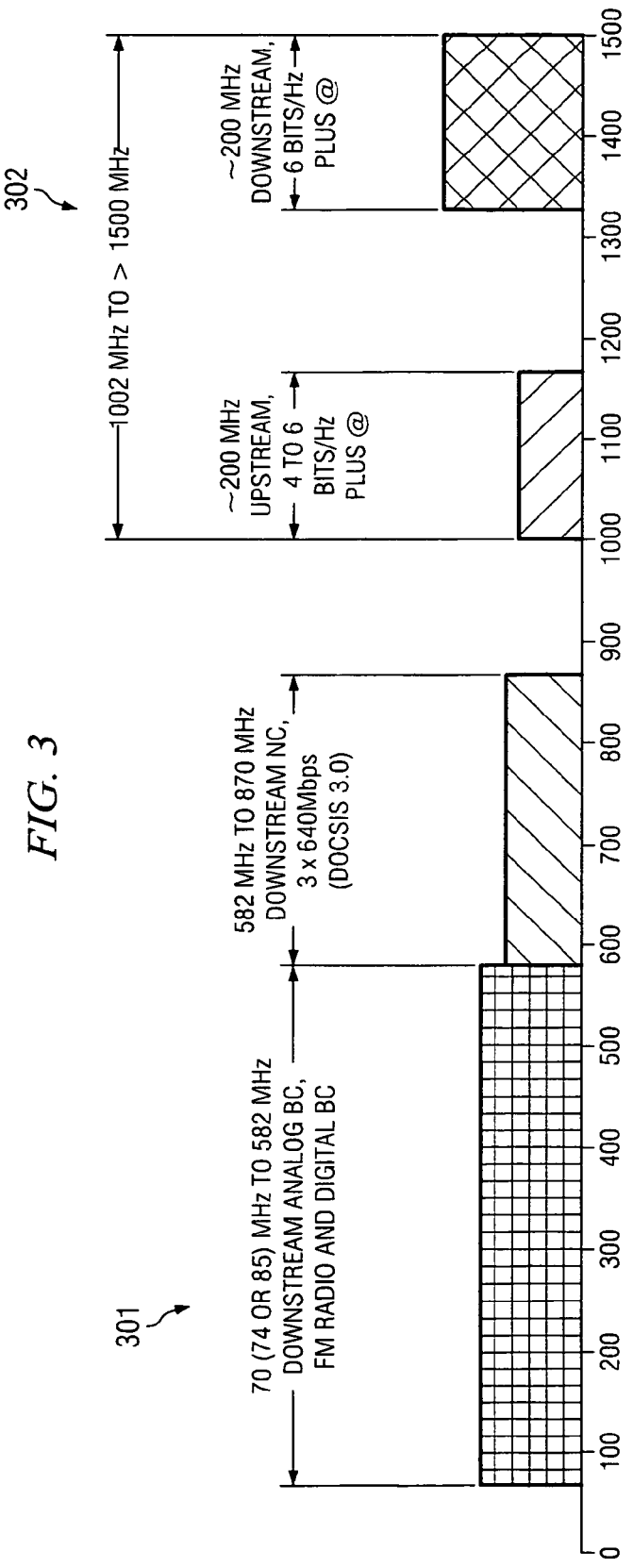
FIG. 3 shows a schematic view of a frequency allocation, representing an embodiment of the invention

FIG. 3 shows one possible example of frequency allocation. Conventional HFC cable networks dedicate on or more TV channels in the 582-870 MHz spectrum 301 for the data transfer. The invention uses frequencies above 1000 MHz 302 for both upstream and downstream data paths. In this instance, the 1002-1202 MHz band is used for upstream data flow, while the 1300-1500 MHz band is used for downstream data flow. This is just one example and the current invention is not limited to this particular allocation.

An embodiment of the invention can also be included in a kit-of-parts. The kit-of-parts can include some, or all, of the components that an embodiment of the invention includes.

The kit-of-parts can be an in-the-field retrofit kit-of-parts to improve existing systems that are capable of incorporating an embodiment of the invention. The kit-of-parts can include software, firmware and/or hardware for carrying out an embodiment of the invention. The kit-of-parts can also contain instructions for practicing an embodiment of the invention. Unless otherwise specified, the components, software, firmware, hardware and/or instructions of the kit-of-parts can be the same as those used in an embodiment of the invention.

EXAMPLES

Specific embodiments of the invention will now be further described by the following, nonlimiting examples which will serve to illustrate in some detail various features. The following examples are included to facilitate an understanding of ways in which an embodiment of the invention may be practiced. It should be appreciated that the examples which follow represent embodiments discovered to function well in the practice of the invention, and thus can be considered to constitute preferred mode(s) for the practice of the embodiments of the invention. However, it should be appreciated that many changes can be made in the exemplary embodiments which are disclosed while still obtaining like or similar result without departing from the spirit and scope of an embodiment of the invention. Accordingly, the examples should not be construed as limiting the scope of the invention.

Example 1

Figure 4:
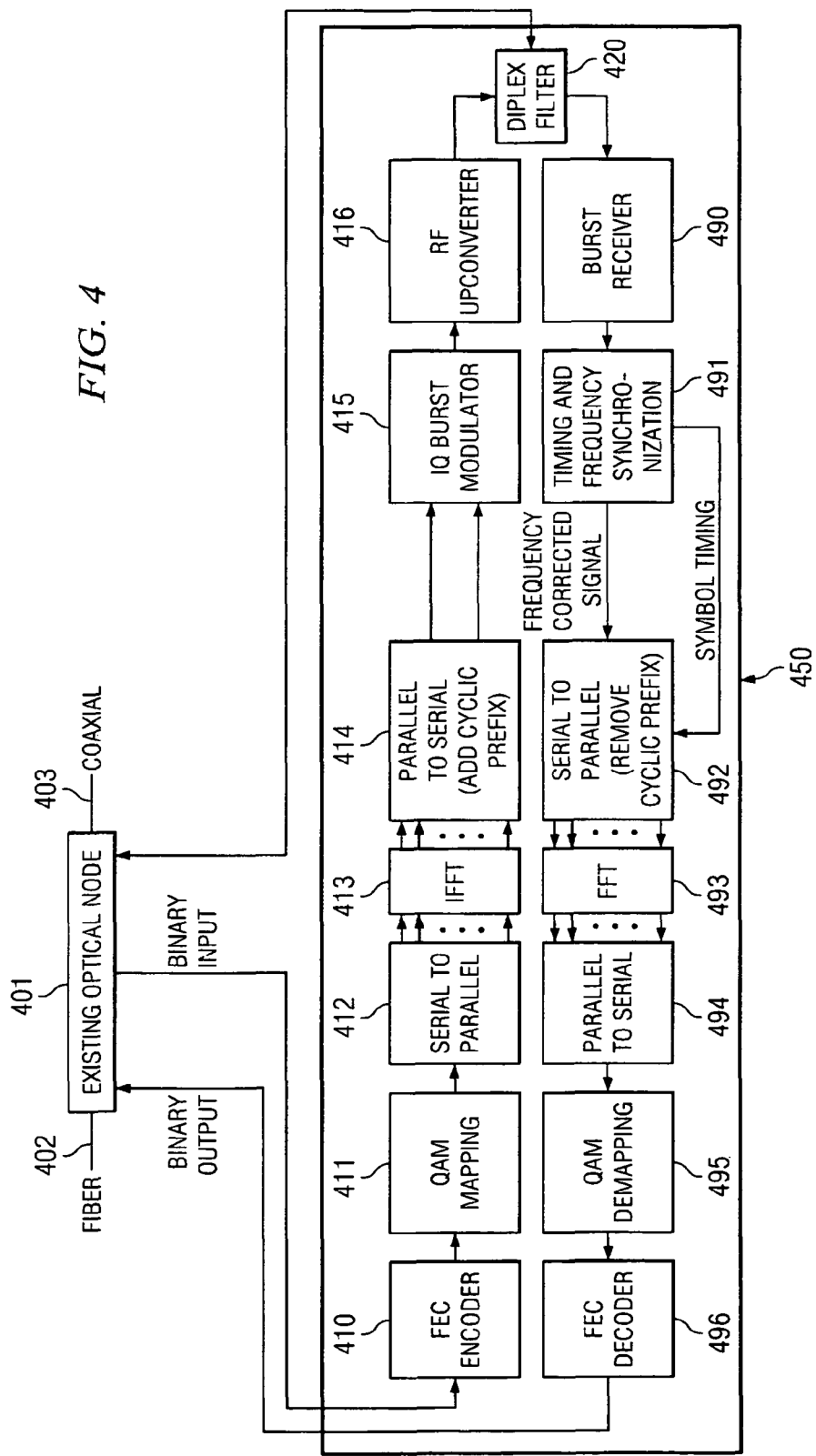
FIG. 4 shows a schematic view of a network, representing an embodiment of the invention.

FIG. 4 shows a first embodiment of the invention, which illustrated the schematic for a module 450 which is placed next to an existing optical module 410 in a separate hardened and weather resistant housing. The existing optical module converts optical signals form a fiber 402, into RF signals sent down the coaxial cable 403. Likewise, requests from subscribers are sent through the coaxial cables and converted to optical signals to be received by the CMTS through the optical node. This embodiment adds only a physical layer to the HFC network, and thus all routing and media access control is performed either by the CMTS, the cable modems, and/or possibly by a MAC located in the existing optical module. The physical layer implementation of this example is OFDM coding with QAM modulation. The optical fiber provides a Gigabit Ethernet baseband connection to the headend. Data packets arriving at the CMTS are assigned tne destination address for the cable modem for which they are headed and are routed to the proper optical node. At the node, the packets are converted from optical signals into binary RF signals. Forward error correction is applied by encoder 410 by adding redundancy to the data to be transmitted. QAM modulation is then applied to the data (411) and sent to a serial to parallel buffer 412. OFDM coding is applied to the data by calculating the Inverse Fast Fourier Transform 413 and the IQ modulator 415 converts the data into an analog RF signal. The upconverter 416 then converts the signal to above 1 GHz and sends it through the diplex filter 420. The signal is received by all the cable modems downstream from the node, and decoded. The cable modem with the proper destination address, as determined by the media access controller of that modem, then accepts the data packet. The upstream path generally follows the reverse procedure. The diplex filter 420 receives signals and passes those bellow 1202 MHz to the burst receiver 490. Timing and frequency synchronization 491 is performed before doing an Fast Fourier Transform 493 to decode the signal, which is then send to decode the QAM mapping 495. Finally, FEC 496 is performed to check the data for errors. In order to receive signals at the higher frequencies, the cable modems served by the optical node will have to be upgraded. If the modems are already using OFDM coding with QAM modulations, then the cheapest solution is to provide new tuners or downconverters and upconverters. Since the optical node is in a hardened, weather resistant case in a secluded location, wear and tear do not play as big a role as they do for the customer premises equipment. Therefore a cheap solution for the modem upgrades is generally desirable. Downconverters and upconverters can be supplied as an external unit between the modem and the coaxial cables for those customers that wish to pay for the larger bandwidth. Alternately, new tuners can be installed inside the modems. At the other end of the spectrum, new cable modems can be provided which are fully compatible with the new module.

As an alternate embodiment, each cable modem serviced by the node could be assigned a specific frequency in the bandwidth. Data packets arriving at the node would be stored in a buffer and a look-up performed based on the destination address in the header of the packet. Once the frequency assigned to the destination address is obtained, the data is modulated and encoded through OFDM onto the frequency. The cable modem assigned that particular frequency then retrieves the data. Each modem would likewise have an upstream frequency from the upstream bandwidth. At the optical node, all upstream traffic would be simply be decoded and forwarded to the CMTS.

Specific implementations of the algorithms for modulation and coding can be implemented by hardware, software, or a combination of the two, and can use readily commercially available software or IC (integrated circuit) components.

Example 2

Figure 5:
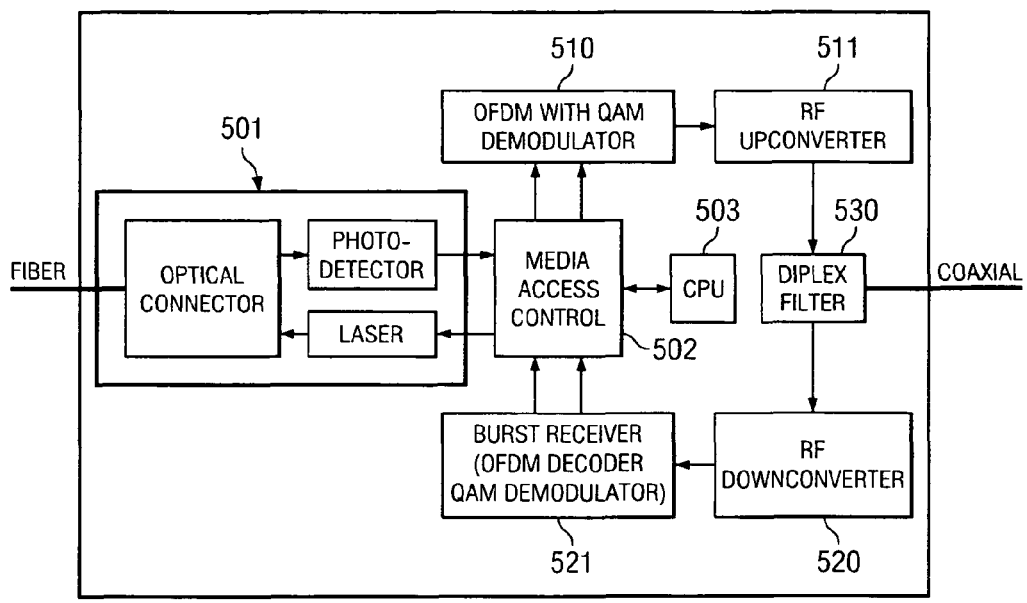
FIG. 5 shows a schematic view of a module, representing an embodiment of the invention.

FIG. 5 illustrates a second embodiment of the invention. In this embodiment, a whole new optical node is provided. An optical-to-coaxial unit 501 includes a photodetector and a laser. A media access controller 502 and a CPU 503 handles the flow of data in the node. It handles the datalink operations of the network, which for DOCSIS is the IEEE 802.2 standard. The media access controller handles frames of data, detects transmission errors from the CMTS and the cable modems, inserts destination and source MAC addresses into each frame of data, and controls access to the physical medium. The MAC controller can be implemented through hardware, software, or a combination of the two, the methods of doing so known to one of ordinary skill in the art. The modulator 510 and demodulator 521 handle most of the physical layer tasks of coding and modulating the frames. An upconverter 511 and downconverter 520 convert the signal up and down from the above 1 GHz bandwidth and a diplex filter 530 separates the upstream and downstream data.

The cable modems served by the optical node will have to be upgraded in this embodiment as well. At least downconverters and upconverters or new tuners will have to be installed. Depending on the MAC protocols implemented in the node, new MAC controllers might be needed for the cable modems.

Example 3

Figure 6:
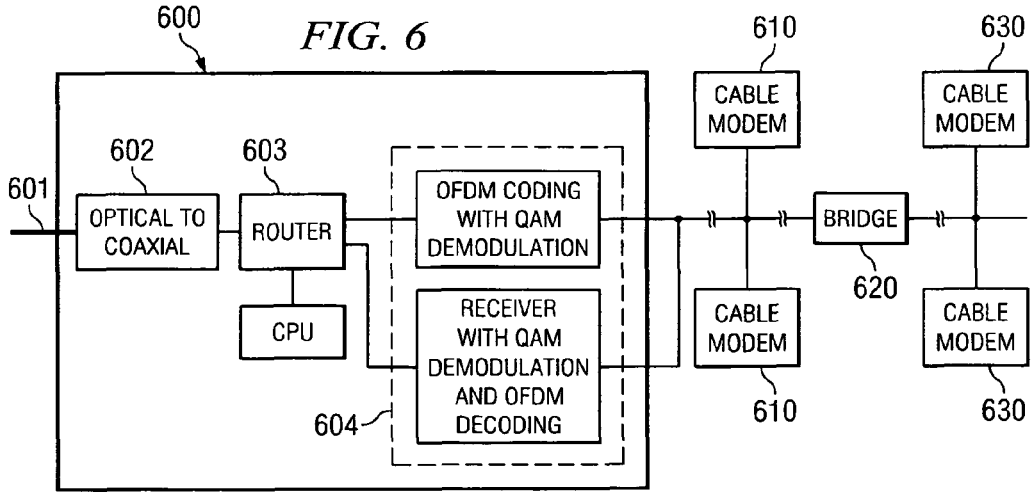
FIG. 6 shows a schematic view of a module together with a portion of partially passive (sub)network, representing an embodiment of the invention.

FIG. 6 shows a third embodiment of the invention. In this embodiment, the new optical node 600 provides an entire Ethernet network functioning across coaxial cables at a bandwidth above 1 GHz. The optical fiber 601 provides the connection to the Ethernet network of the headend. Once converted to an electrical signal by the optical-to-coaxial stage 602, the data from the headend network interfaces with a router 603. The router handles the routing of the data coming through the node, which includes the admission control, congestion control, and reservation tasks. It performs policing, switching, and output scheduling of the datapaths and defines its own IP addressing domain. It is thus a level 3 (network) device. The modulator and demodulator 604 interface the router with the rest of the Ethernet network, which is now the whole coaxial cable domain. Because of the limits of an Ethernet network, such as the 500 m maximum length between members and the maximum bit travel time of 25.6 µs, active devices must be provided. The bridge 620 is a repeater with datalink functions, which handles complete frames. The Ethernet network can function on TDMA, or alternately, each modem is assigned a specific frequency with which it communicates with the router. The router receives the frame from a modem at that specific frequency, and if the destination is at the same node, rebroadcasts it at the frequency assigned to the destination modem.

Example 4

Figure 7:
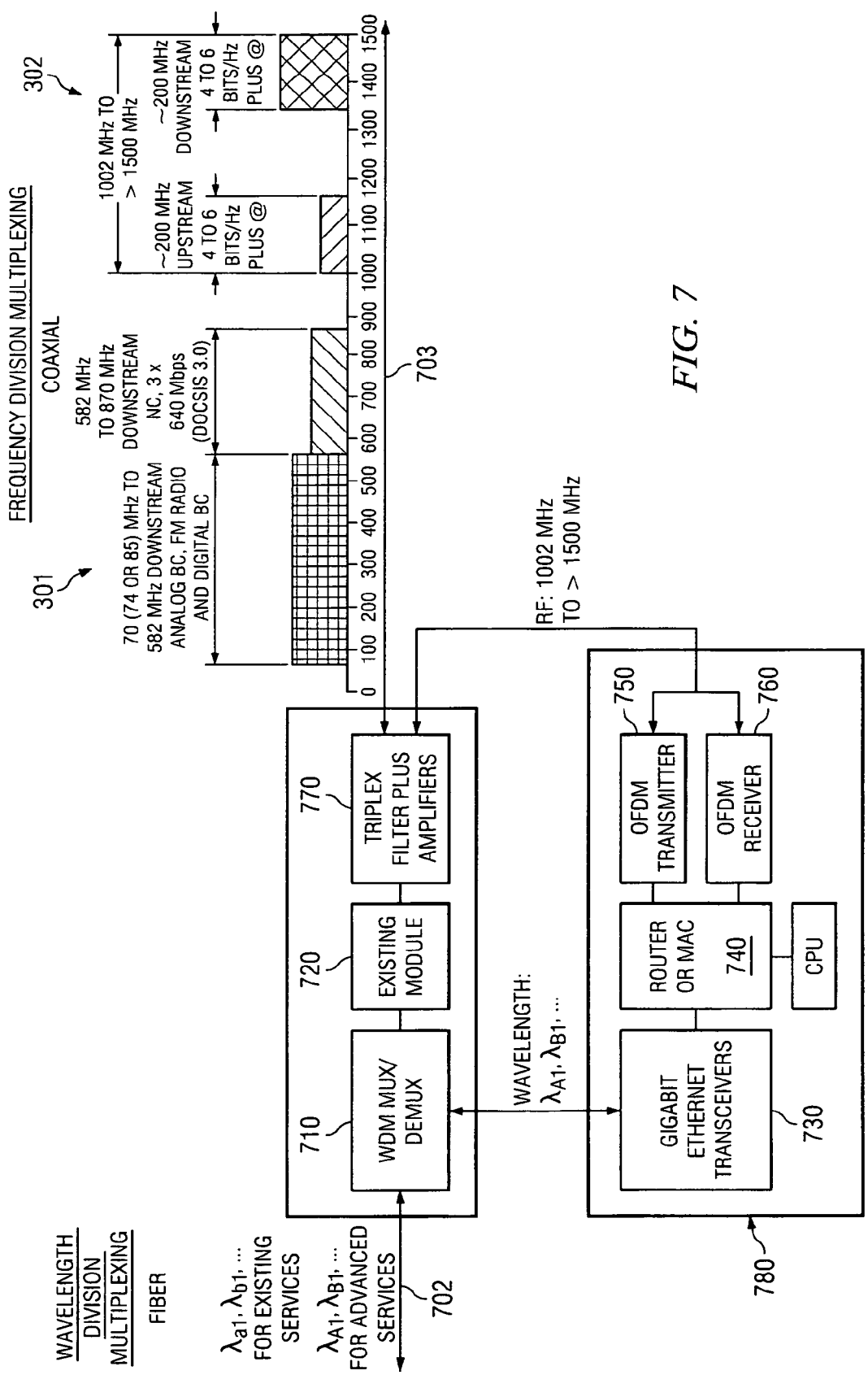
FIG. 7 shows a schematic view of a module together with a frequency allocation, representing an embodiment of the invention.

FIG. 7 shows a fourth embodiment of the invention. The multiplexing in the fiber (optical) portion can be termed wavelength division multiplexing and the multiplexing in the coaxial (radio frequency) portion can be termed frequency division multiplexing. The data transfer system includes a wavelength division mux/demux 710 located between a headend (not shown in FIG. 7) and a hybrid fiber cable module 720. A plurality of transceivers 730 is coupled to the wavelength division mux/demux 710. A unit 740 including a router or media access controller is coupled to the plurality of transceivers 730. An orthogonal frequency division multiplexing transmitter 750 is coupled to the unit 740. An orthogonal frequency division multiplexing receiver 760 is coupled to the unit 740. A filter-amplifier unit 770 is coupled to the orthogonal frequency division multiplexing transmitter 750 and the orthogonal frequency division multiplexing receiver 760. The filter-amplifier unit 770 is located between the hybrid fiber cable module 720 and at least one customer premises equipment (not shown in FIG. 7). The WDM Mux/Demux components are readily commercially available from companies such as JDSU (e.g. arrayed waveguide 50 or 100 GHz narrowband or wideband) and Avanex (e.g., 100 or 200 GHz (single channel) dense wavelength division multiplexer components or modules).

Thus, in this example, transferring data includes: wavelength division demultiplexing a plurality of downstream signals using a wavelength division mux/demux located between a headend and a hybrid fiber cable module; transmitting the plurality of downstream signals using a plurality of transceivers coupled to the wavelength division mux/demux; directing the plurality of downstream signals using a member selected from the group consisting of a router and a media access controller coupled to the plurality of transceivers; transmitting the plurality of downstream signals using an orthogonal frequency division multiplexing transmitter coupled to the member; and filtering and amplifying the plurality of down stream signals using a filter-amplifier unit coupled to the orthogonal frequency division multiplexing transmitter, the filter-amplifier unit located between the hybrid fiber cable module and at least one customer premises equipment. Further, in this example, transferring data includes: receiving a plurality of upstream signals using an orthogonal frequency division multiplexing receiver; directing the plurality of upstream signals using the member; receiving the plurality of upstream signals using the plurality of transceivers; and wavelength division multiplexing the plurality of upstream signals using the wavelength division mux/demux.

This embodiment includes a module 780 which is placed next to the existing optical module 720, optionally in a separate hardened and weather resistant housing. The existing optical module 720 converts optical signals in a set of wavelengths (a1, b1, . . . ) from a fiber 702, into RF signals sent down the coaxial cable 703.

This embodiment adds an additional two-way digital communication path to the HFC network. By using WDM technology, a set of wavelengths (A1, B1, . . . ) carrying baseband Gigabit Ethernet signals from the headend are added to the same optical fiber 702. At the node, the Gigabit Ethernet packets are converted from baseband optical signals into wideband RF signals at 1002-1500 MHz as shown in FIG. 7.

This separate communication path can have similar capacity as the ones provided by BPON, EPON and GPON technologies and also has the capability of supporting advanced multimedia services, such as IPTV and VOD.

The combination of WDM over the optical fiber and FDM over the coaxial cable provides the most economical architecture to support the existing services and emerging bandwidth-demanding multimedia applications. New applications can be added without disrupting the existing services. At the same time, existing services in the legacy RF spectrum can be migrated to the new wideband IP channel using advanced IP technologies. Of course, this embodiment of the invention is just one example and the invention is not limited to this particular wavelength and RF frequency allocation.

A significant advantage of the invention is that the invention can provide additional gigabit bandwidth without disrupting the existing services. Gigabit Ethernet packets can be sent optically via WDM from the cable headend to the optical node, and, then electrically via FDM from the optical node to the home. The invention can utilize a frequency band that is currently not available in the HFC network. This invention can provide enough bandwidth to be a standalone complete solution to support all services in IP or to be an add-on to provide only gigabit Internet services. The invention can be used in the context of both (1) existing HFC networks and (2) advanced "passive" networks. The invention can provide LAN-like performance. Specifically, the invention can provide low latency, minimum contention and LAN-like quality of service. The invention can include distributed monitoring and management systems.

Figure 8:
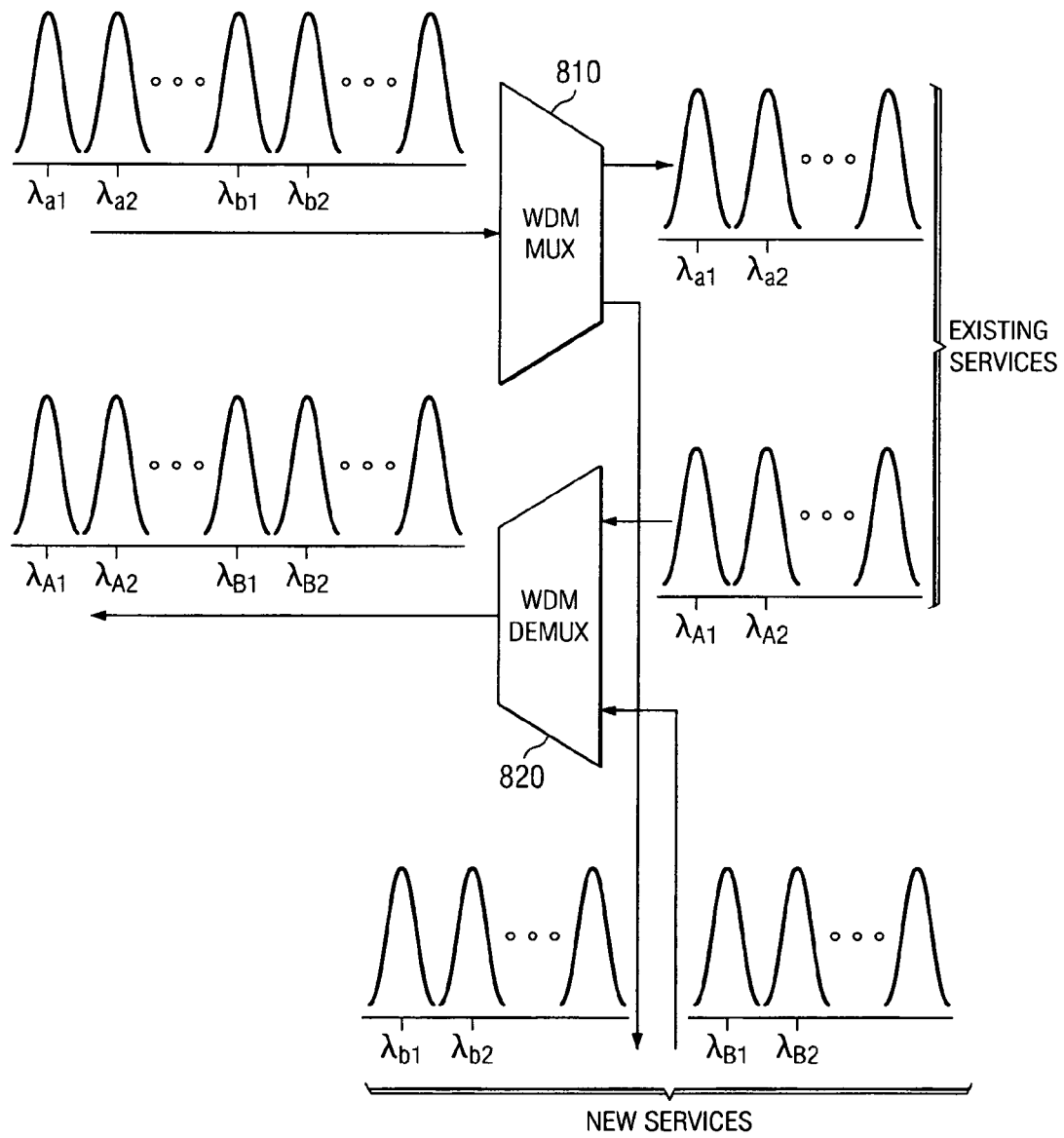
FIG. 8 is a schematic view of a WDM Mux DeMux pair, representing an embodiment of the invention.

FIG. 8 shows a WDM (wavelength division multiplexing) Mux (multiplexer 810) DeMux (demultiplexer 820) pair. Referring to FIG. 8, it is important to appreciate that an important advantage of the invention is that it can be a solution that does not involve disruption to existing services with the use of wavelength division multiplexing.

Definitions

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The phrase radio frequency is intended to mean frequencies less than or equal to approximately 300 GHz as well as the infrared spectrum. The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition. Unless otherwise defined, all technical and scientific terms used herein have the same meaning as commonly understood by one of ordinary skill in the art to which this invention belongs. In case of conflict, the present specification, including definitions, will control.

Conclusion

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials.

It can be appreciated by those of ordinary skill in the art to which embodiments of the invention pertain that various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. An apparatus comprising:
  a data transfer system which sends and receives data over a coaxial network at a bandwidth above 1000 MHz wherein the data transfer system is located at an optical node of a hybrid fiber-coaxial network, including:
    a forward path including:
      an FEC encoder;
      a QAM modulator;
      an OFDM encoder; and
      an RF upconverter; and
    a return path including:
      an RF downconverter;
      a burst receiver;
      a timing and frequency synchronization circuit;
      an OFDM decoder; and
      a QAM demodulator.

2. The apparatus of claim 1, further comprising a media access controller.

3. An apparatus comprising:
  a data transfer system which sends and receives data over a coaxial network, wherein the data transfer system is located at an optical node of a hybrid fiber-coaxial network, wherein the data transfer system forms an Ethernet network and includes:
    an optical node including:

an optical-to-coaxial stage;
a router with a CPU;
a modulator; and
a demodulator;
a plurality of cable modems; and
a plurality of bridges;
wherein the optical node, the plurality of cable modems, and the plurality of bridges are interconnected with coaxial cables.

4. A method comprising a process of transferring data over a coaxial network between an optical node and a plurality of cable modems of a hybrid fiber-coaxial cable network, wherein the process of transferring data comprises the steps of:
transmitting data, including the steps of:
forward error correction;
QAM modulation;
OFDM coding; and
upconversion; and
receiving data, including the steps of:
downconversion;
timing and frequency synchronization;
OFDM decoding; and
QAM demodulation.

5. A method comprising a process of transferring data over a coaxial network between an optical node and a plurality of cable modems of a hybrid fiber-coaxial cable network, wherein the process of transferring data comprises:
receiving a data packet at the optical node;
assigning a destination MAC address to the data packet, the destination MAC address belonging to a cable modem of the plurality of cable modems to which the data packet is sent;
coding and modulating the data packet;
transmitting the data packet across a coaxial cable;
and receiving the data packet at the cable modem of the plurality of cable modems to which the data packet is sent.

* * * * *